(12) United States Patent
Jenny et al.

(10) Patent No.: US 7,140,326 B2
(45) Date of Patent: Nov. 28, 2006

(54) QUICK RELEASE HARNESS

(75) Inventors: Janet E. Jenny, 4026 Liska Cir., Valdosta, GA (US) 31605; Rodney L. Babcock, San Luis Obispo, CA (US); Stewart D. Hudson, Nipomo, CA (US)

(73) Assignee: Janet E. Jenny, York, PA (US)

( * ) Notice: Subject to any disclaimer, the term of this patent is extended or adjusted under 35 U.S.C. 154(b) by 1 day.

(21) Appl. No.: 10/843,403

(22) Filed: May 10, 2004

(65) Prior Publication Data

US 2005/0263101 A1 Dec. 1, 2005

(51) Int. Cl.
*A01K 27/00* (2006.01)
*B68B 5/00* (2006.01)

(52) U.S. Cl. .................. 119/770; 119/772; 16/422; 54/1

(58) Field of Classification Search ............... 119/770, 119/772, 792; 16/428, 422; 54/1, 69; 224/184; 482/69; 244/151 A; 2/311
See application file for complete search history.

(56) References Cited

U.S. PATENT DOCUMENTS

| 1,614,083 | A |   | 1/1927  | Plantico |
| 1,906,043 | A |   | 4/1933  | Bernstein |
| 2,187,021 | A |   | 1/1940  | Everson |
| 2,499,107 | A | * | 2/1950  | Miller ............... 244/151 A |
| 2,970,796 | A | * | 2/1961  | Ross ................ 244/151 A |
| 5,471,953 | A |   | 12/1995 | Sporn |
| 5,498,219 | A | * | 3/1996  | Soufi ................. 482/69 |
| 5,937,794 | A |   | 8/1999  | Hediger |
| 6,161,505 | A |   | 12/2000 | Noguero |
| 6,167,844 | B1 |   | 1/2001  | Cantrell et al. |
| 6,338,699 | B1 | * | 1/2002  | Veitch ............... 482/69 |
| 6,408,799 | B1 |   | 6/2002  | Franck |
| 6,427,426 | B1 | * | 8/2002  | Dunton et al. .......... 54/1 |
| 6,688,259 | B1 |   | 2/2004  | Axel |
| 6,694,923 | B1 |   | 2/2004  | Fouche |
| 2003/0066494 | A1 |   | 4/2003  | Hippensteel |
| 2004/0025804 | A1 |   | 2/2004  | Smith et al. |

\* cited by examiner

*Primary Examiner*—Robert P. Swiatek
(74) *Attorney, Agent, or Firm*—Thomas F. Lebens; Sinsheimer Juhnke Lebens & McIvor, LLP (57) ABSTRACT

A handle apparatus for use with a harness comprising a handle grip; a first release joint coupled to the handle grip; a second release joint coupled to the handle grip; and a release line coupled to the first release joint and the second release joint. A harness assembly comprising a harness; a handle assembly including a handle grip; a first release joint coupled to the handle grip; a second release joint coupled to the handle grip; and a release mechanism coupled to the first release joint and the second release joint; wherein the handle grip is released from the harness upon activation of the release mechanism.

14 Claims, 8 Drawing Sheets

QUICK RELEASE HARNESS

BACKGROUND OF THE INVENTION

1. Field of the Invention

The present invention relates generally to harnesses. Even more specifically, the present invention relates to an apparatus and method for a quick release pet harness.

2. Discussion of the Related Art

Guide dogs or service animals are used to help disabled persons. Service dogs can benefit people with disabilities associated with many diagnoses, including (but not limited to): Spinal cord/head trauma (injury, stroke), Visual or hearing deficits, Arthritis, Ataxia/poor balance, Multiple sclerosis, Cerebral palsy, Muscular dystrophy, Spina bifida, Seizure disorders, Cardio/pulmonary disease, Arteriovascular disease (primary or secondary to diabetes, etc.), Psychiatric disabilities.

Service dogs can be trained to reliably perform many tasks. For example, a service dog can be trained in leading a person who has a visual impairment around obstacles, to destinations (seating, across street, to/through door, to/into elevator, etc.). Guide dogs can also discriminate between sounds in order, for example, to alert a person with a hearing impairment to the presence of specific sounds, such as: smoke/fire/clock alarms, telephone, baby crying, sirens, another person's presence, timers buzzing, knocks at a door, or other unusual sounds. Service dogs can also give general assistance to their guardian, including: helping person balance for transfer/ambulation, pulling wheelchair, helping person rise from sitting or fallen position, getting items that are dropped or otherwise out of reach, and e.g., helping to open/close doors and drawers, helping person undress/dress, carrying items in backpack, acting as physical buffer to jostling by others, putting clothes in washer/remove from dryer, and barking to alert for help.

Generally, federal laws protect people with disabilities to be accompanied by their service animals. No deposits or extra fees may be charged for the service animal. ID or "certification" of the service dog's training, or of the person's disability, cannot be required for access on buses, trains, planes, taxis, rental cars, US-registered cruise ships or to places open to the public.

Thus, service animals are involved in almost every aspect of many different people's lives. Many of the public places that a service animal will go with their guardian will be crowded or generally not ideally designed to accommodate a service dog. For example, there is little or no room between the seats in a bus to accommodate both the service dog and their guardian. Additionally, many places that a service dog may be present will also have other dogs present. This can lead to other dogs attacking the service dog. These types of problems can cause discomfort or injury to both the service dog and their guardian. These problems are increased when the harness for the service dog has a fixed handle from the service dog to the guardian. For example, the handle can poke the dog in the back when in a cramped space. Furthermore, service dogs have broken their backs in fights due to landing on the fixed handle that is part of a harness assembly.

Thus, a harness assembly and/or handle which overcome these and other problems and disadvantages is needed.

SUMMARY OF THE INVENTION

The present invention advantageously addresses the needs above as well as other needs by providing a quick release harness for animals.

One embodiment includes a handle apparatus for use with a harness comprising a handle grip; a first release joint coupled to the handle grip; a second release joint coupled to the handle grip; and a release line coupled to the first release joint and the second release joint.

Another embodiment can be characterized as a harness assembly comprising a harness; a handle assembly including: a handle grip; a first release joint coupled to the handle grip; a second release joint coupled to the handle grip; and a release mechanism coupled to the first release joint and the second release joint; wherein the handle grip is released from the harness upon activation of the release mechanism.

Yet another embodiment includes a method comprising coupling a handle to a harness through a first release joint; coupling a handle to a harness through a second release joint; and activating a release mechanism to release the handle from the first release joint and the second release joint.

A further embodiment can be characterized as an apparatus comprising means for coupling a handle to a harness through a first release joint; means for coupling a handle to a harness through a second release joint; and means for activating a release mechanism to release the handle from the first release joint and the second release joint.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. Additionally, the following description also will be discussed with reference to a service dog and a harness for a service dog, however, the present invention also is used with other animals and with dogs that are not service animals. Furthermore, features of the present invention are also used in applications other than with harnesses and handles. The scope of the invention should be determined with reference to the claims.

Figure 1:
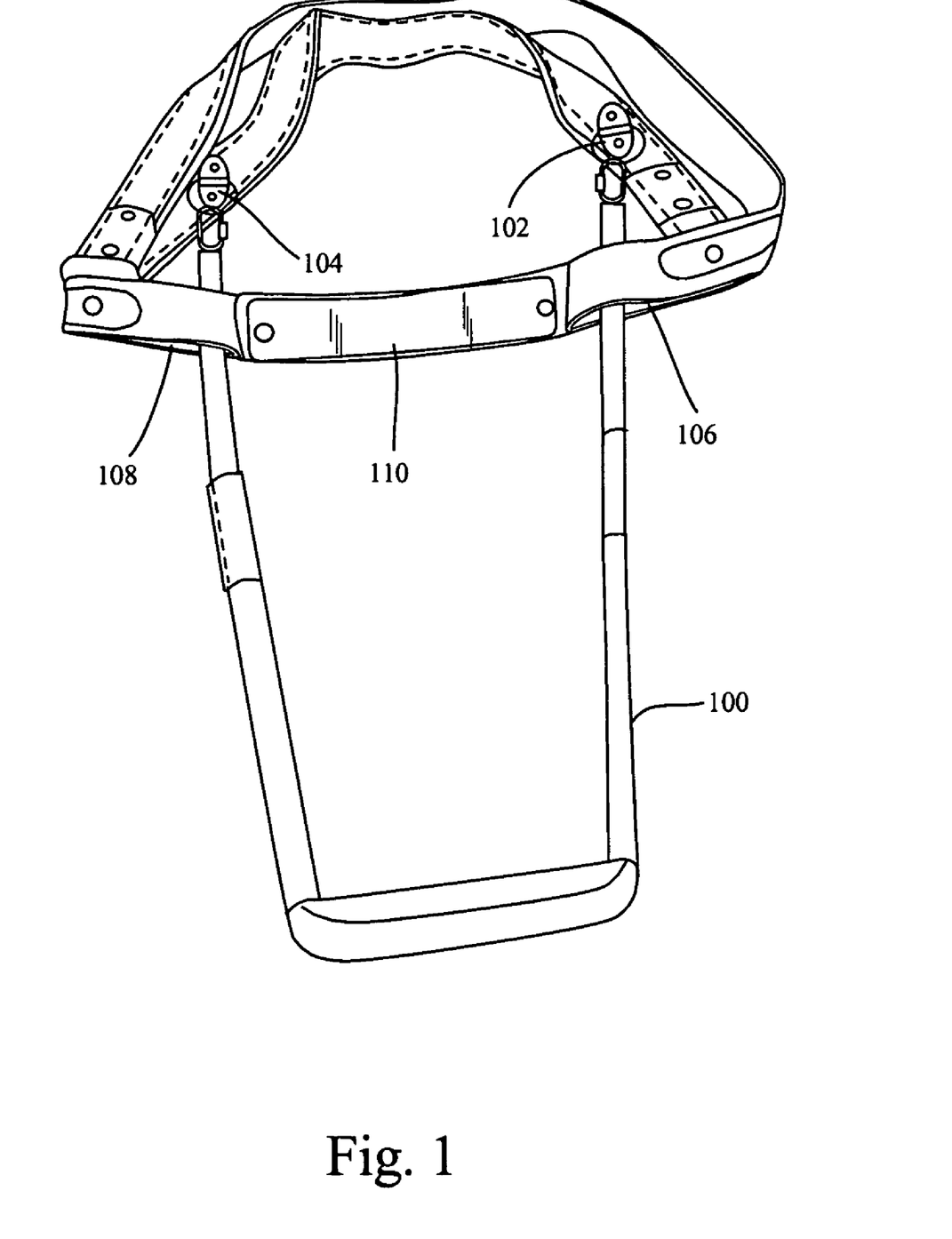
FIG. 1 is an isometric diagram illustrating an exemplary harness assembly.

Referring to FIG. 1 an isometric diagram is shown illustrating an exemplary harness assembly. Show is a handle 100, a first clip assembly 102, a second clip assembly 104, a first handle loop 106, a second handle loop 108, and a harness 110.

The harness assembly includes the handle 100, the first clip assembly 102, the second clip assembly 104, the first handle loop 106, the second handle loop 108, and the harness 110.

The harness 110 is coupled to the handle 100 through the first clip assembly 102 and the second clip assembly 104. The first clip assembly 102 and the second clip assembly 104 include a ring and a clip, such that the clip can be closed around the ring to securely attach the handle to the harness. The clip can be, for example, a threaded chain connector, such as the first handle clip or the second handle clip shown and described below at least with reference to FIG. 2.

When connected to the harness, the handle goes through the first handle loop 106 and the second handle loop 108. The first handle loop 106 and the second handle loop 108 keep the handle 100 centered on the harness and also provide for increased control over the guide dog.

The harness can be many different types of harnesses, however, the harness preferably runs across the back of the guide dog, around the neck or chest, through the front two legs, around the lower chest in back of the front legs, and returns to the back of the guide dog. This configuration provides for control over the guide dog and also is comfortable for the guide dog to wear. Alternatively, the harness will run across the back of the guide dog and around the neck. The harness will also run across the back of the guide dog and around the underside of the guide dog without going through the front two legs of the dog. As described, many different types of harnesses are utilized in accordance with different embodiments of the present invention.

To disconnect the handle from the guide dog, the guardian or other person must reach down to the first clip assembly 102 and the second clip assembly. Next, the first clip assembly 102 and the second clip assembly 104 will individually be disconnected, for example, by unscrewing a threaded chain connector. Finally, the handle will need to be slid through the first handle loop 106 and the second handle loop 108. This is a time consuming process and is very difficult to perform in crowded or emergency situations. This process can be further complicated or difficult to perform for many disabled people, who are generally those in need of the guide dog.

Figure 2:
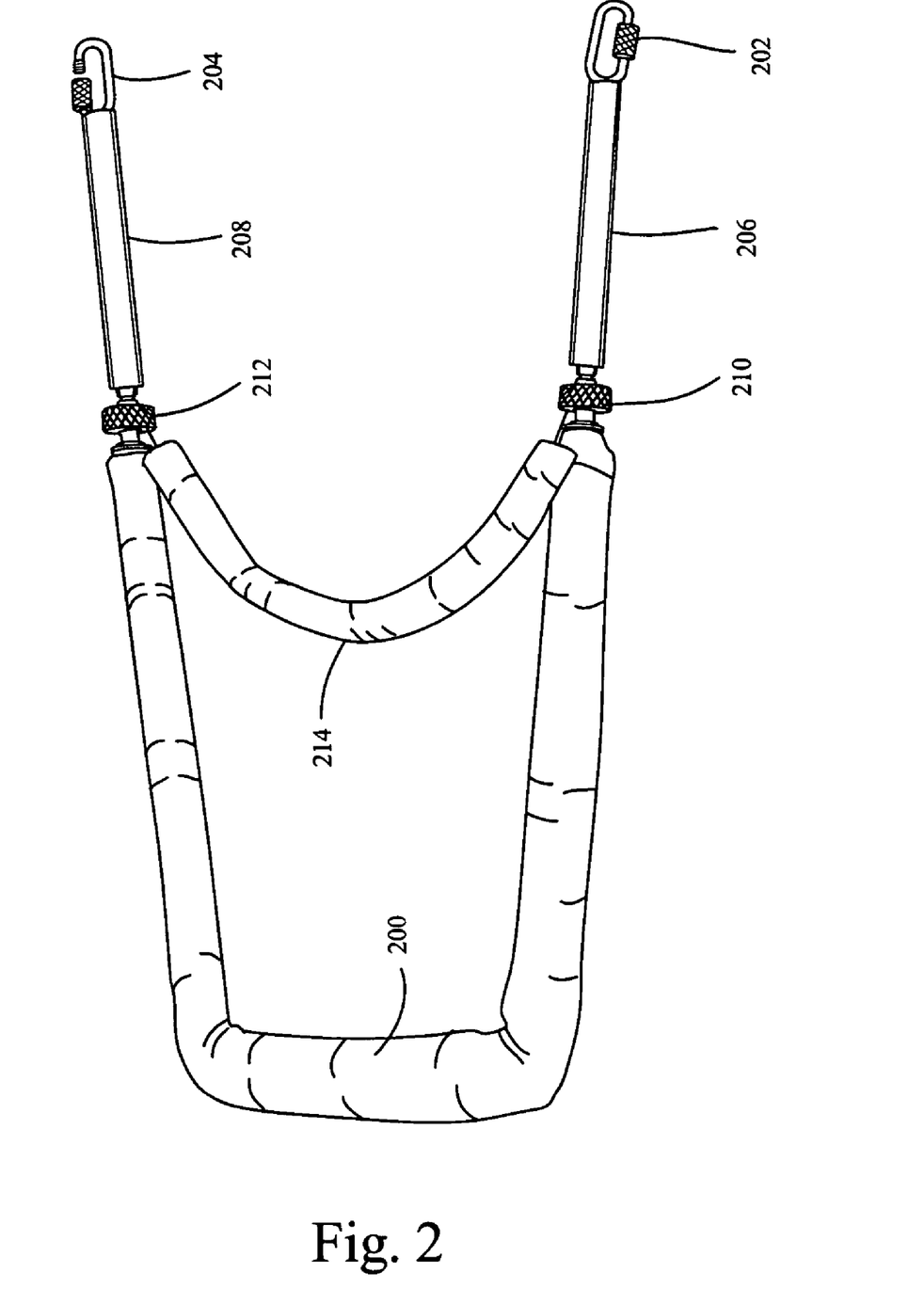
FIG. 2 is a diagram illustrating a handle for a harness assembly in accordance with an embodiment of the present invention.

Referring to FIG. 2 a diagram is shown illustrating a handle for a harness in accordance with an embodiment of the present invention. Shown is a handle grip 200, a release line 214, a first handle clip 202, a second handle clip 204, a first end rod 206, a second end rod 208, a first release joint 210, and a second release joint 212.

The handle grip 200 is coupled to the first end rod 206 and the second end rod 208 through the first release joint 210 and the second release joint 212. The first release joint 210 and the second release joint 212 are coupled to the release line 214. The first end rod 206 and the second end rod 208 are also coupled to the first handle clip 202 and the second handle clip 204, respectively. In a preferred embodiment, the first release joint 210, the second release joint 212, the first end rod 206, the second end rod 208, the first handle clip 202 and the second handle clip 204 are made from metal, however, different materials can be used. In one preferred embodiment, the first end rod 206 and the second end rod 208 are welded to the first handle clip 202 and the second handle clip 204, respectively.

In one embodiment, the handle grip 200 is generally U-shaped and preferably made from a rigid or semi-rigid material, such as for example, metal, wood, plastic, polymer, or composite. In one preferred embodiment, the handle grip 200 is made from tubular steel (e.g., 0.250 4130 aircraft rd or the equivalent). Alternatively, embodiments include a non-rigid handle grip 200 and differently shaped handle grips. The handle grip 200 is also preferably wrapped in leather or other material such that it will be comfortable for the guardian of the guide dog to hold onto. As described, the handle grip 200 is generally U-shaped, however, other shapes of the handle grip 200 are utilized in different embodiments. Preferably, the handle grip 200 is coupled to the harness through the first handle clip 202 and the second handle clip 204, to provide two connection points to the harness. This provides stability for both the guide animal and the guardian of the guide animal. The first release joint 210 and the second release joint 212 are preferably located in between a top of the handle grip 200 (i.e., the portion of the handle grip 200 generally held onto by the guardian) and the first handle clip 202 and the second handle clip 204.

The release line 214 is also generally U-shaped, however, the shape varies in different embodiments. The release line 214 is preferably a metal wired covered with leather. This provides a flexible release line 214 that is also comfortable for the guardian to pull on. Alternatively, the release line 214 can be a bar (rigid or semi-rigid) coupled between the first release joint 210 and the second release joint 212. The bar can be made from, for example, metal, plastic, wood, polymer, or composite. In operation, when the release line 214 is pulled, the first release joint 210 and the second release joint 212 will release, thus freeing the handle grip 200 from the first end rod 206 and the second end rod 208. The operation of the handle will be further described below.

Figure 3:
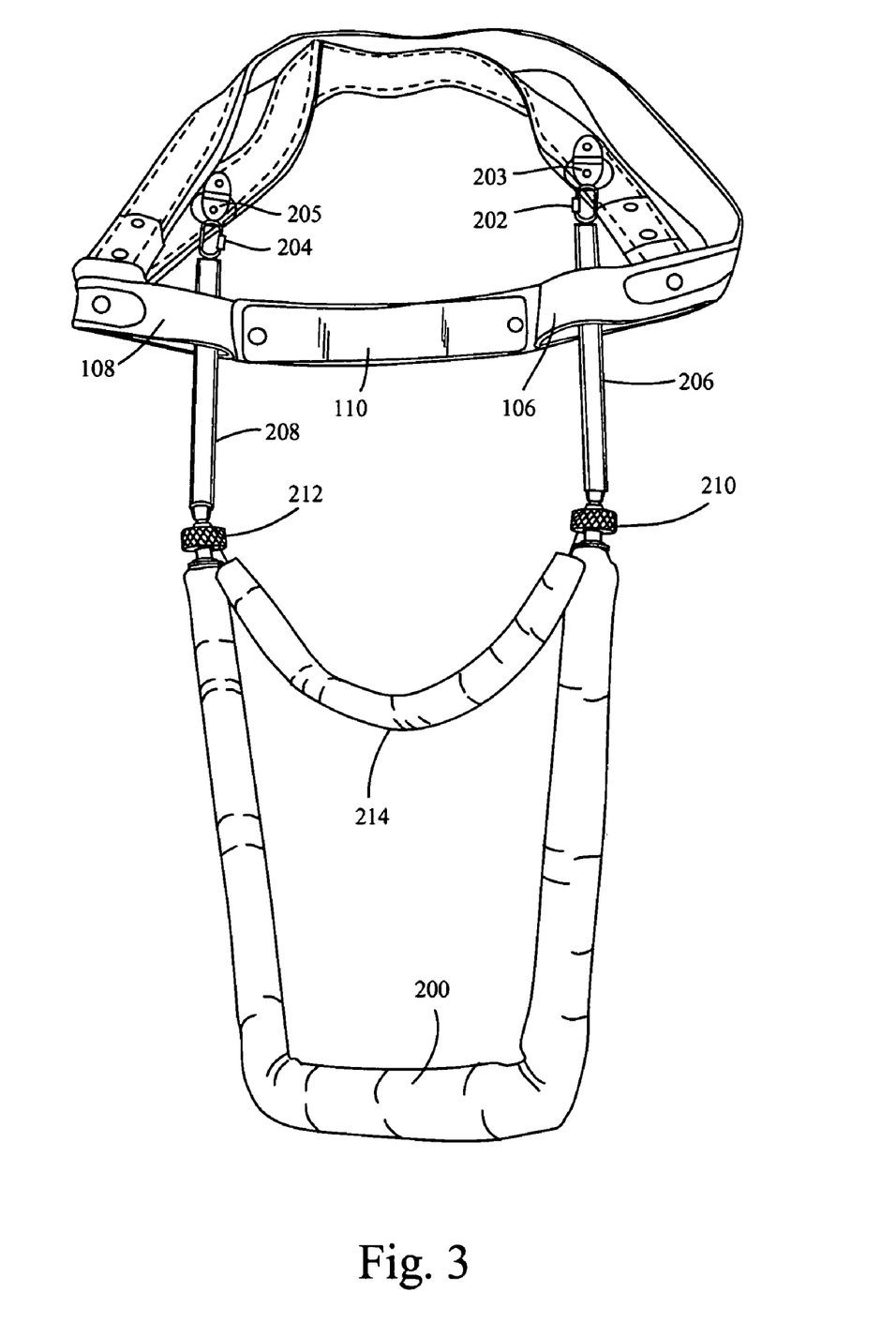
FIG. 3 is an isometric diagram illustrating a harness assembly incorporating the handle of FIG. 2 in accordance with one embodiment of the present invention.

FIG. 3 is an isometric diagram illustrating a harness assembly incorporating the handle of FIG. 2 in accordance with one embodiment of the present invention. Shown is the first handle loop 106, the second handle loop 108, the harness 110, the handle grip 200, the release line 214, the first handle clip 202, a first harness ring 203, the second handle clip 204, a second harness ring 205, the first end rod 206, the second end rod 208, the first release joint 210, and the second release joint 212.

The harness 110 is coupled to the first harness ring 203 and the second harness ring 205. Preferably, the first handle clip 202 and the second handle clip 204 are removably coupled to the first harness ring 203 and the second harness ring 205, respectively. In an alternative embodiment, the first hand clip 202 and the second handle clip 204 are coupled to the first harness ring 203 and the second harness ring 205 such that first hand clip 202 and the second handle clip 204 can not be readily removed from the first harness ring 203 and the second harness ring 205. The first handle clip 202 and the second handle clip are also coupled to the first end rod 206 and the second end rod 208, respectively.

The first end rod 206 and the second end rod 208 go through the first handle loop 106 and the second handle loop 108, respectively. In one embodiment, the first end rod 206 and the second end rod 208 are long enough (e.g., 6 inches long) such that when the handle grip 200 is disconnected, the handle rods will remain through the handle loops unless disconnected at the first handle clip 202 and the second handle clip 204. Alternatively, the end rods 206, 208 are very short such that the first release joint 210 and the second release joint 212 are used for the first handle clip 202 and the second handle clip 204. In this embodiment, the handle optionally does not go through the first handle loop 106 and the second handle loop 108. In the preferred embodiment, the first handle loop 106 and the second handle loop 108 keep the handle 100 centered on the harness and also provide for increased control over the guide dog. Alternatively, the handle assembly shown in FIG. 2 can be utilized with a harness that does not incorporate handle loops.

As described above with reference to FIG. 2, the handle grip 200 is coupled to the first end rod 206 and the second end rod 208 through the first release joint 210 and the second release joint 212. The first release joint 210 and the second release joint 212 are also coupled to the release line 214.

In operation, when the release line 214 is activated (e.g., pulled upon by a guardian or other person), the handle grip 200 will disconnect from the first end rod 206 and the second end rod 208 at approximately the same time. This is accomplished through the first release joint 210 and the second release joint 212. One embodiment of the first release joint 210 and the second release joint 212 will be further described herein at least with reference to FIGS. 5–9. The present invention is not limited to the specific release joints described herein and other release mechanisms are used in alternative embodiments. Preferably, the release mechanism utilized will disconnect the handle grip 200 at the first release joint 210 and the second release joint 212 at approximately the same time. Advantageously, this allows for a quick removal of the handle grip 200 upon activation of the release mechanism (e.g., the release line 214). In prior art systems, in order to remove the handle, a person would have to individually remove the first clip assembly 102 and the second clip assembly 104 (such as is shown in FIG. 1) by unscrewing a threaded chain connector from a ring of the clip assembly. This is a time consuming process that can be unmanageable in some situation (e.g., when the service animal is being attacked by a dog, or in very tight spaces).

Advantageously, the release line 214 is located in a convenient position to take a hold of and pull (if attempting to release the handle grip). When the handle is pulled off, the first end rod 206 and the second end rod 208 remain coupled to the harness 110, and preferably remain through the first handle loop 106 and the second handle loop 108 such that the first end rod 206 and the second end rod 208 do not protrude out from the service animal. This helps to remove danger from the service animal and make transporting the service animal easier and more comfortable.

Figure 4:
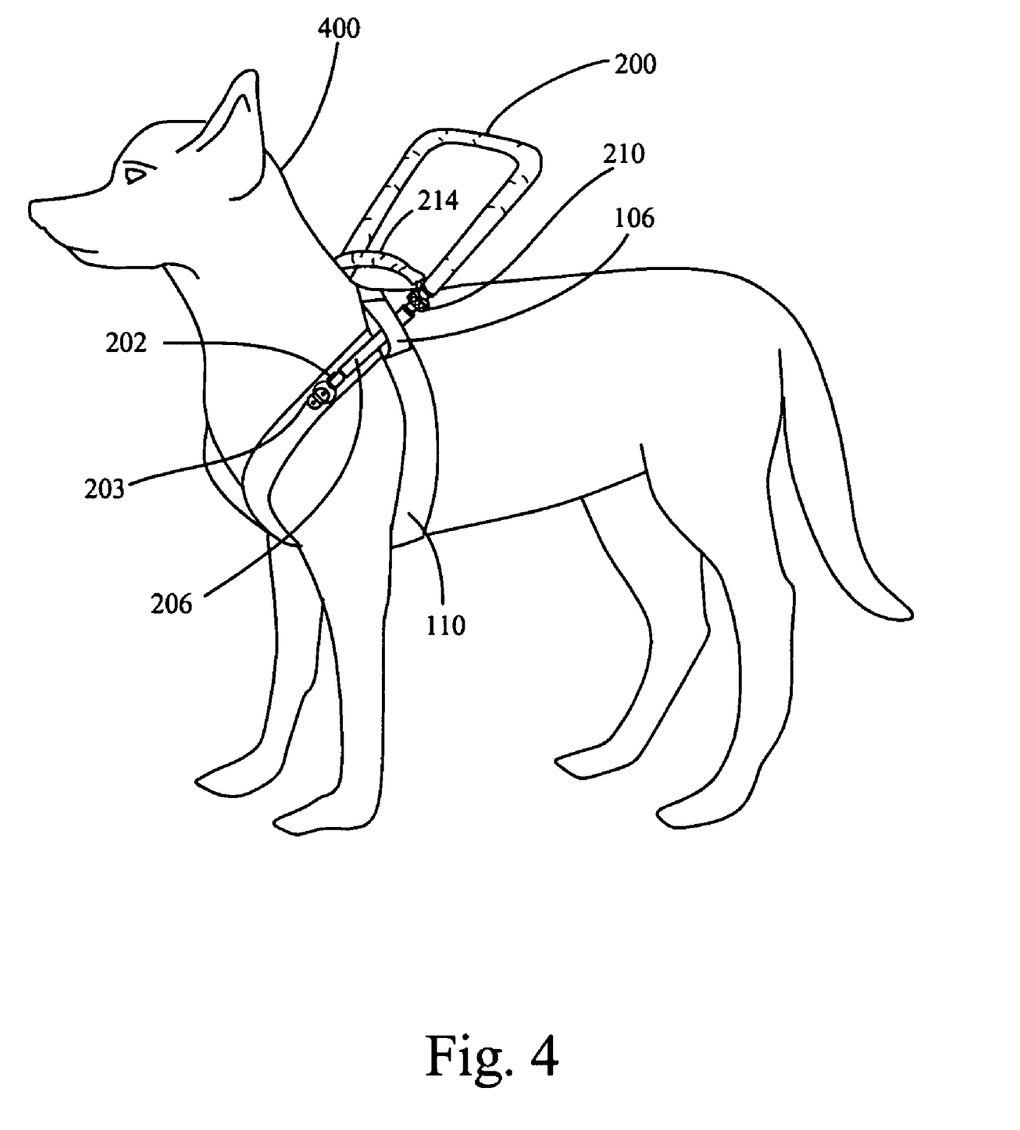
FIG. 4 is a diagram illustrating the harness assembly of FIG. 3 placed on an animal in accordance with one embodiment of the present invention.

Referring to FIG. 4 an isometric diagram is shown illustrating the harness assembly of FIG. 3 placed on an animal in accordance with one embodiment of the present invention. Shown is the handle grip 200, the release line 214, the first handle clip 202, the first end rod 206, the first release joint 210, the first harness ring 203, the harness 110 and a dog 400.

As shown, the release line 214 is located close to the harness 110. In an alternative embodiment, the release line 214 can be any length or can be an adjustable length. Altering the length provides for convenient use for people of different heights or simply provides for people who have different preference on where the release line 214 should be located. In another alternative embodiment, a grip or handle is attached to the release line to provide a convenient and easily reachable mechanism for activating the release line and releasing the first release joint 210 and the second release joint 212.

Figure 5:
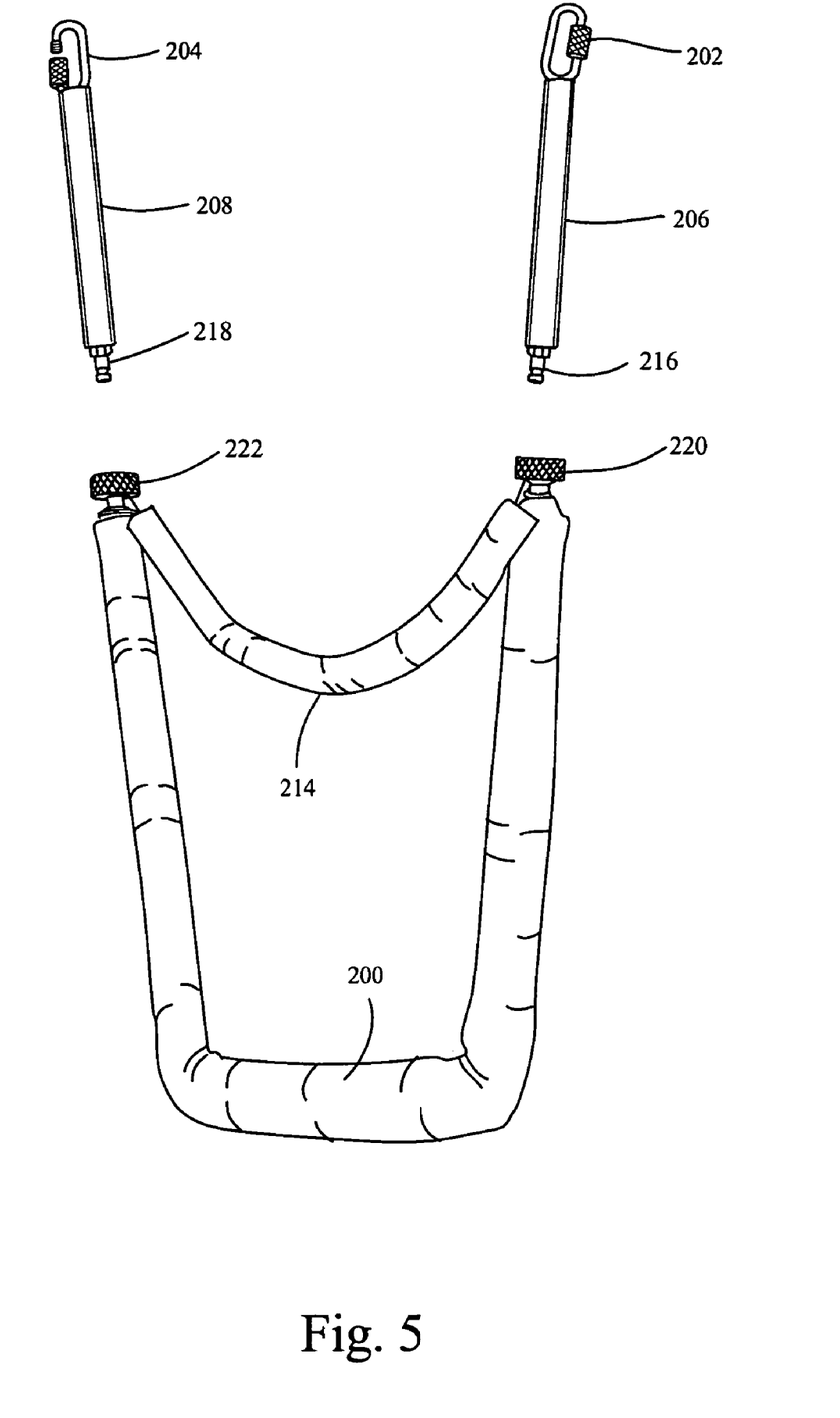
FIG. 5 is a diagram illustrating the handle of FIG. 2 disconnected from end rods of the handle in accordance with an embodiment of the present invention.

Referring to FIG. 5 a diagram is shown illustrating the handle of FIG. 2 disconnected from end rods of the handle in accordance with an embodiment of the present invention. Shown is the handle grip 200, the release line 214, the first handle clip 202, the second handle clip 204, the first end rod 206, the second end rod 208, a first male fitting 216, a second male fitting 218, a first female fitting 220, and a second female fitting 222.

FIG. 5 is substantially the same as FIG. 2 however, the first end rod 206 and the second end rod 208 are removed from the handle grip 200. The first male fitting 216 and the first female fitting 220 combine to make the first release joint 210 shown in FIG. 2. The second male fitting 218 and the second female fitting 222 combine to make the second release joint 212 shown in FIG. 2. As will be described in greater detail with reference to FIGS. 5–9, when first release joint 210 is connected the first male fitting 216 is located inside of the first female fitting 220. The female fitting 220 includes a sleeve fitting (shown and described below with reference to FIG. 6). When the sleeve fitting is moved in a direction away from the first male fitting 216, the first female fitting 220 and the first male fitting 216 disengage. This is one preferred embodiment for the first release joint 210 and the second release joint 212, however, other mechanisms can be utilized without deviating from the scope of the present invention.

Figure 6:
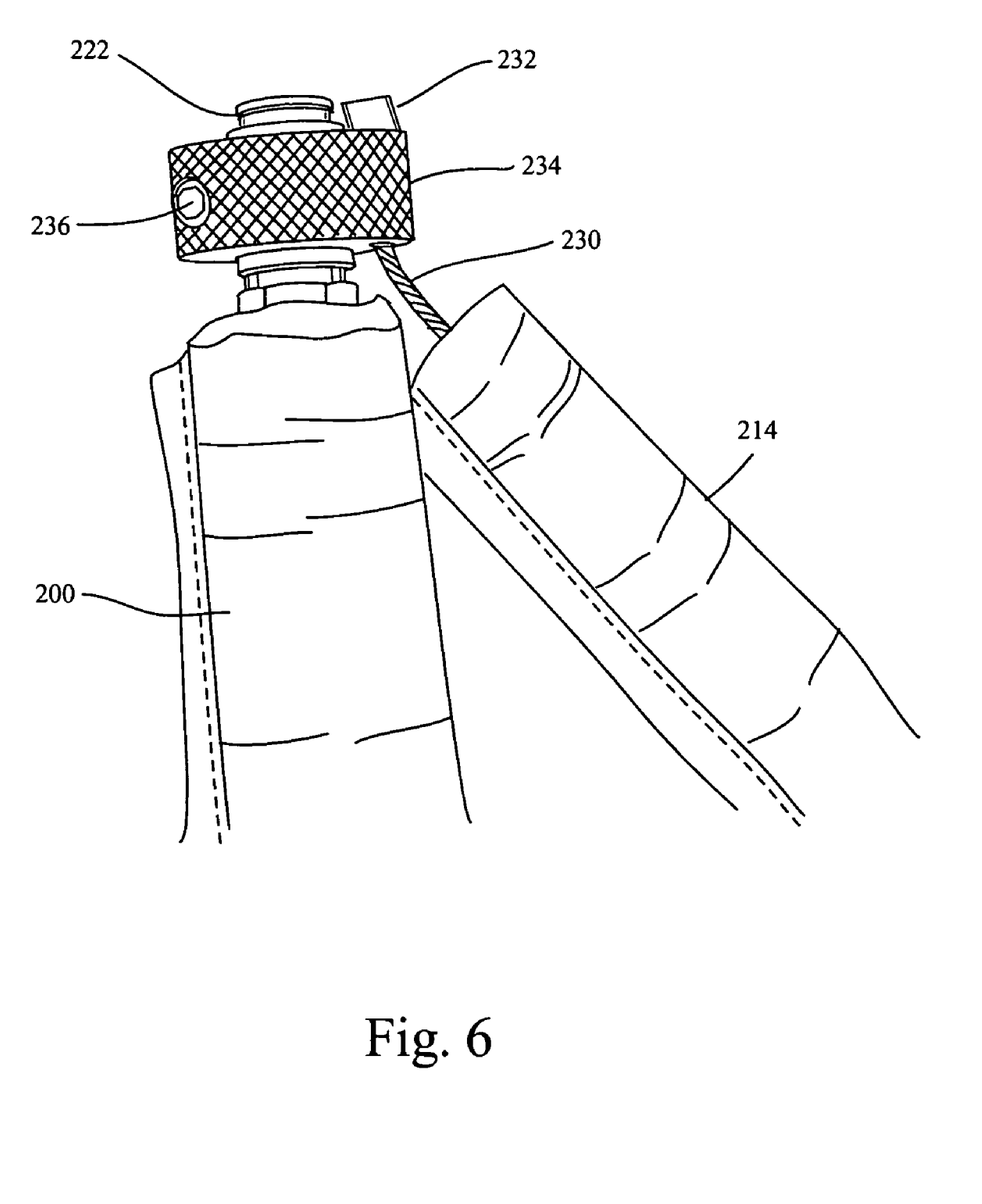
FIG. 6 is a diagram illustrating a portion of the handle of FIG. 2 in accordance with an embodiment of the present invention.

Referring to FIG. 6 a diagram is shown illustrating a portion of the handle of FIG. 2 in accordance with an embodiment of the present invention. Shown is a portion of the handle grip 200, a portion of the release line 214, a release wire 230, a stopper 232, the second female fitting 222, a sleeve fitting 234, and a fastener 236.

The release wire 230 runs through the release line 214. In one embodiment, the release line is constructed from leather to provide a comfortable grip for a person holding the handle. Alternative materials are used in different embodiments. The release wire travels through a hole in the sleeve fitting 234 and is coupled to the stopper.

The sleeve fitting 234 is coupled to a sleeve portion (shown in FIG. 9) of the second female fitting 222. The second female fitting is also connected to the handle grip 200. The sleeve fitting 234 is clamped onto the sleeve portion of the second female fitting 222 through the fastener 236. Preferably, the fastener 236 is a screw (e.g., a stainless steal screw) that securely fastens the sleeve fitting 234 to the sleeve portion of the second female fitting, however, many different fasteners can be used in alternative embodiments.

In operation, when the release line 214 is activated (e.g., pulled upon by a guardian of a guide dog) the stopper 232 will engage the sleeve fitting 234. The sleeve fitting 234 will move toward the handle grip 200, thus allowing for the second male fitting (not shown) to release from the second female fitting 222.

Figure 7:
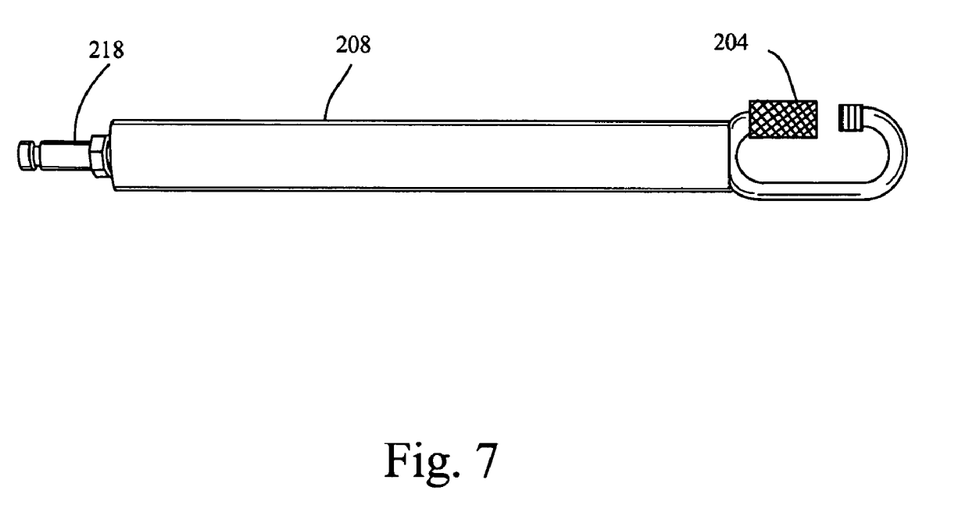
FIG. 7 is a diagram illustrating one of the end rods of FIG. 5 in accordance with an embodiment of the present invention.

Referring to FIG. 7 a diagram is shown illustrating the second end rod of FIG. 5 in accordance with an embodiment of the present invention. Shown is the second handle clip 204, the second end rod 208, and the second male fitting 218.

The second male fitting 218 is coupled to the second end rod 208. The second handle clip 204 is also coupled to the second end rod 208. In one embodiment, the second male fitting 218 and the second handle clip 204 are both welded to the second end rod 208. Alternatively, a threaded portion of the second male fitting (shown in FIG. 8) is fitted to a corresponding threaded portion of the second end rod 208 in order to attach the second male fitting 218 to the second end rod 208. The second end rod, the second male fitting 218 and the second handle clip 204 are preferably constructed from metal, however, many other materials can be used (e.g., plastic, polymers, or alloys). The length of the end rod 208 can vary so as to fit different size animals.

The first end rod 206 is constructed and functions in the same manner as the second end rod 208.

Figure 8:
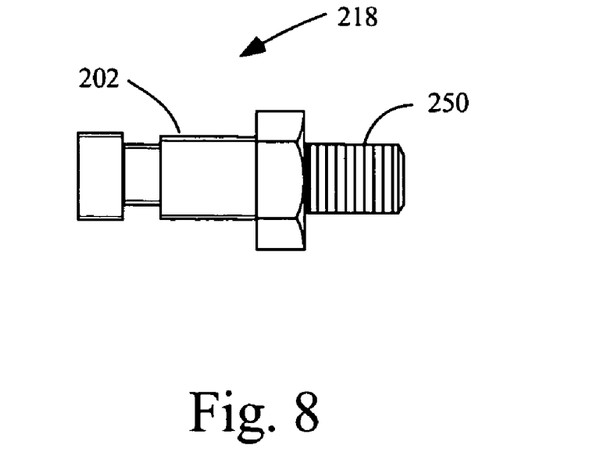
FIG. 8 is a diagram illustrating a male fitting of the end rod shown in FIG. 7 in accordance with another embodiment of the present invention.

Referring to FIG. 8 a diagram is shown illustrating the male fitting of the end rod shown in FIG. 7 in accordance with another embodiment of the present invention. Shown is the male fitting 218, a connector portion 252 and a threaded portion 250.

Figure 9:
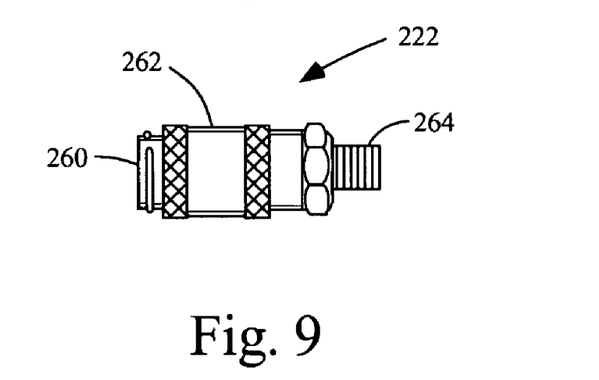
FIG. 9 is a diagram illustrating a female fitting of FIG. 6 in accordance with an embodiment of the present invention.

Referring to FIG. 9 a diagram is shown illustrating a female fitting of FIG. 6 in accordance with an embodiment of the present invention. Shown is the second female fitting 222, a connector portion 260, a sleeve portion 262, and a threaded portion 264.

The threaded portion 250 is used to connect the second male fitting 218 to the second end rod 208. The connector portion 252 of the male fitting 218 will connect to the connector portion 260 of the second female fitting 222. The threaded portion 264 of the second female fitting 222 is connected to a corresponding threaded portion of the handle 200. Alternatively, the threaded portion 264 of the second female fitting 222 can be welded to the handle 200.

In operation the sleeve portion 262 of the female fitting is moved toward the threaded portion 264 of the female fitting 222 in order to release the male fitting 218 from the female fitting 222. This provide for one convenient release means for the harness assembly. Other release means are used in different embodiments.

Figure 10:
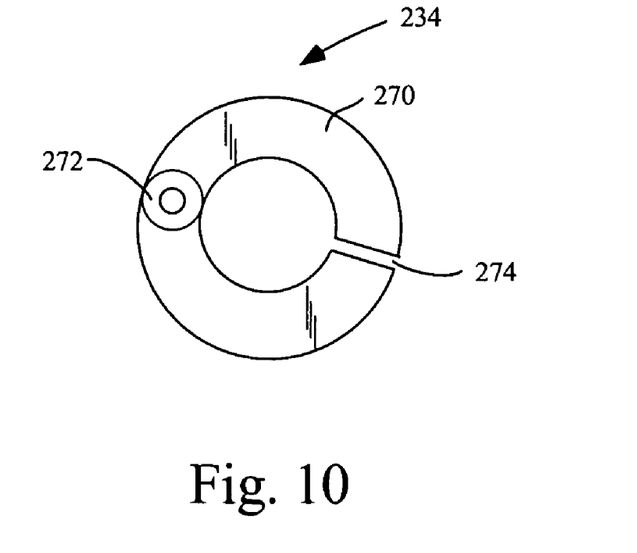
FIG. 10 is a diagram illustrating a sleeve of FIG. 6 in accordance with an alternative embodiment of the present invention.

Referring to FIG. 10 a diagram is shown illustrating the sleeve fitting 234 of FIG. 6 in accordance with an embodiment of the present invention. Shown is a body portion 270, a stopper hole 272, and an adjustment notch 274.

The sleeve fitting is coupled to the sleeve portion 262 of the female fitting 222. The release wire 230 (shown in FIG. 6) is coupled to the sleeve fitting 234 through the stopper hole 272. The adjustment notch 274 is utilized to secure the sleeve fitting to the female fitting 222.

In operation, when the release wire 230 pulls on the body portion 270 of the sleeve fitting, the sleeve portion 262 of the female fitting 222 is moved toward the threaded portion 264 of the female fitting 222 in order to release the male fitting 218 from the female fitting 222.

FIGS. 8–10 show the separated components of one embodiment for the first release joint 210 and the second release joint 212. It should be understood that different embodiments will employ different mechanisms that are well within the scope of the present invention for providing the first release joint 210 and the second release joint 212.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

We claim:

1. A handle apparatus for use with a harness comprising:
   a generally U-shaped, rigid handle grip;
   a first release joint coupled to the handle grip;
   a second release joint coupled to the handle grip; and
   a substantially continuous release line coupled both to the first release joint and the second release joint;
   wherein the handle grip releases from the first release joint and the second release joint upon activation of the release line.

2. The apparatus of claim 1 further comprising:
   a first end rod coupled to the first release joint; and
   a second end rod coupled to the second release joint.

3. The apparatus of claim 1 wherein the first release joint comprises:
   a first female fitting;
      a first sleeve coupled to the first female fitting; and
      a first male fitting detachably coupled to the first female fitting.

4. The apparatus of claim 3 wherein the second release joint comprises:
   a second female fitting;
      a second sleeve coupled to the second female fitting; and
      a second male fitting detachably coupled to the second female fitting.

5. The apparatus of claim 4 wherein the release line is coupled to the first sleeve and the second sleeve;
   wherein the first male fitting detaches from the first female fitting when the release line is pulled;
   wherein the second male fitting detaches from the second female fitting when the release line is pulled.

6. The apparatus of claim 1 further comprising:
   a first end rod coupled to the first release joint;
   a second end rod coupled to the second release joint; and
   means for coupling the first end rod and the second end rod to a harness.

7. A harness assembly comprising:
   a harness;
   a handle assembly including:
      a generally U-shaped, rigid handle grip;
      a first release joint coupled to the handle grip;
      a second release joint coupled to the handle grip; and
      a release mechanism coupled to the first release joint and the second release joint;
   wherein the handle grip is released from the harness upon activation of the release mechanism.

8. The harness assembly of claim 7 further comprising:
   a first end rod coupled to the first release joint; and
   a second end rod coupled to the second release joint.

9. The harness assembly of claim 7 wherein the first release joint comprises:
   a first female fitting;
      a first sleeve coupled to the first female fitting; and
      a first male fitting detachably coupled to the first female fitting.

10. The harness assembly of claim 9 wherein the second release joint comprises:
    a second female fitting;
       a second sleeve coupled to the second female fitting; and
       a second male fitting detachably coupled to the second female fitting.

11. The harness assembly of claim 10 wherein the release mechanism is coupled to the first sleeve and the second sleeve;
  wherein the first male fitting detaches from the first female fitting upon activation of the release mechanism;
  wherein the second male fitting detaches from the second female fitting upon activation of the release mechanism.

12. The harness assembly of claim 7 further comprising:
  a first end rod coupled to the first release joint;
  a second end rod coupled to the second release joint; and
  means for coupling the first end rod and the second end rod to a harness.

13. An apparatus including a harness and a generally U-shaped, rigid handle comprising:
  means for coupling a handle to said harness through a first release joint;
  means for coupling said handle to said harness through a second release joint; and
  means for activating a release mechanism to release the handle from the first release joint and the second release joint.

14. The apparatus of claim 13 further comprising means for releasing the handle from the first release joint and the second release joint at approximately the same time.

* * * * *